United States Patent
Cruz-Hernandez et al.

(10) Patent No.: US 9,448,713 B2
(45) Date of Patent: Sep. 20, 2016

(54) ELECTRO-VIBROTACTILE DISPLAY

(75) Inventors: Juan Manuel Cruz-Hernandez, Montreal (CA); Danny A. Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 162 days.

(21) Appl. No.: 13/092,269

(22) Filed: Apr. 22, 2011

(65) Prior Publication Data

US 2012/0268412 A1   Oct. 25, 2012

(51) Int. Cl.
*G06F 3/0488* (2013.01)
*G06F 3/01* (2006.01)
*G06F 3/041* (2006.01)

(52) U.S. Cl.
CPC .......... *G06F 3/0488* (2013.01); *G06F 3/016* (2013.01); *G06F 3/041* (2013.01); *G06F 2203/014* (2013.01); *G06F 2203/04809* (2013.01)

(58) Field of Classification Search
CPC .............. G06F 3/016–3/041; G06F 3/0488; G06F 1/169; G06F 1/1616–1/1626; G06F 2203/014; G06F 2203/04809
USPC .......................... 340/4.1, 4.12, 407.1, 407.2; 345/168–169, 173–178; 341/20–27, 341/34; 116/205
See application file for complete search history.

(56) References Cited

U.S. PATENT DOCUMENTS

| | | | |
|---|---|---|---|
| 5,149,918 A * | 9/1992 | Kozik et al. | 178/18.05 |
| 7,088,342 B2 | 8/2006 | Rekimoto et al. | |
| 7,205,978 B2 | 4/2007 | Poupyrev et al. | |
| 7,446,456 B2 | 11/2008 | Maruyama et al. | |
| 7,456,823 B2 | 11/2008 | Poupyrev et al. | |
| 7,522,152 B2 | 4/2009 | Olien et al. | |
| 7,554,246 B2 | 6/2009 | Maruyama et al. | |
| 7,663,604 B2 | 2/2010 | Maruyama et al. | |
| 7,755,607 B2 | 7/2010 | Poupyrev et al. | |
| 8,749,495 B2 | 6/2014 | Grant et al. | |
| 8,902,050 B2 | 12/2014 | Heubel et al. | |

(Continued)

FOREIGN PATENT DOCUMENTS

| | | |
|---|---|---|
| JP | H11203020 | 7/1999 |
| JP | 2010-5036579 | 2/2010 |

(Continued)

OTHER PUBLICATIONS

Smith, Ned, "Feel the future: Touch screens that touch back", MSNBC [online], [retrieved Apr. 21, 2011]. Retrieved from the Internet <URL: http://www.msnbc.msn.com/clearprint/CleanPrintProxy.aspx?unique=1303408902146>.

(Continued)

*Primary Examiner* — Hai Phan
*Assistant Examiner* — Orlando Bousono
(74) *Attorney, Agent, or Firm* — Kilpatrick Townsend & Stockton LLP

(57) ABSTRACT

A system for generating a haptic effect with an electrostatic device, alone or in combination with actuators or other devices configured to generate a haptic effect. The system may generate the haptic effect to simulate a coefficient of friction or texture on the surface of a user interface, such as a display screen or touchpad. The simulated coefficient of friction may be adjusted to convey other properties on the user interface surface. The system may also include sensors that measure the simulated coefficient of friction and the impedance at the surface.

49 Claims, 14 Drawing Sheets

(56) References Cited

U.S. PATENT DOCUMENTS

| | | | |
|---|---|---|---|
| 2005/0017947 A1* | 1/2005 | Shahoian et al. | 345/156 |
| 2005/0057528 A1* | 3/2005 | Kleen | 345/173 |
| 2005/0275967 A1* | 12/2005 | Olien et al. | 360/119 |
| 2006/0103634 A1* | 5/2006 | Kim et al. | 345/173 |
| 2006/0167576 A1 | 7/2006 | Rosenberg | |
| 2006/0267944 A1 | 11/2006 | Rosenberg et al. | |
| 2007/0118043 A1 | 5/2007 | Oliver et al. | |
| 2007/0157089 A1* | 7/2007 | Van Os et al. | 715/702 |
| 2007/0236450 A1* | 10/2007 | Colgate et al. | 345/156 |
| 2008/0051919 A1 | 2/2008 | Sakai et al. | |
| 2008/0068348 A1 | 3/2008 | Rosenberg et al. | |
| 2008/0088580 A1 | 4/2008 | Poupyrev et al. | |
| 2008/0097633 A1 | 4/2008 | Jochelson et al. | |
| 2009/0079550 A1 | 3/2009 | Makinen et al. | |
| 2009/0088877 A1 | 4/2009 | Terauchi et al. | |
| 2009/0106655 A1* | 4/2009 | Grant et al. | 715/702 |
| 2009/0109007 A1 | 4/2009 | Makinen et al. | |
| 2009/0251439 A1* | 10/2009 | Westerman et al. | 345/175 |
| 2009/0284485 A1* | 11/2009 | Colgate et al. | 345/173 |
| 2009/0313542 A1* | 12/2009 | Cruz-Hernandez et al. | 715/702 |
| 2010/0013761 A1* | 1/2010 | Birnbaum et al. | 345/156 |
| 2010/0060604 A1* | 3/2010 | Zwart et al. | 345/173 |
| 2010/0085169 A1 | 4/2010 | Poupyrev et al. | |
| 2010/0085316 A1* | 4/2010 | Kim | 345/173 |
| 2010/0127819 A1 | 5/2010 | Radivojevic et al. | |
| 2010/0231367 A1 | 9/2010 | Cruz-Hernandez et al. | |
| 2010/0231539 A1 | 9/2010 | Cruz-Hernandez et al. | |
| 2010/0231550 A1 | 9/2010 | Cruz-Hernandez et al. | |
| 2011/0022594 A1 | 1/2011 | Takatsuka et al. | |
| 2011/0093100 A1 | 4/2011 | Ramsay | |

FOREIGN PATENT DOCUMENTS

| | | |
|---|---|---|
| WO | WO 2009/037379 | 3/2009 |
| WO | WO 2009/141502 | 11/2009 |

OTHER PUBLICATIONS

Greene, Kate, "A Touch Screen with Texture", Technology Review [online], [retrieved Apr. 21, 2011]. Retrieved from the Internet <URL: http://www.technologyreview.com/printer_friendly_article.aspx?id=26506>.

Bonderud, Doug, "Nokia Files Patent to Make Phones Digitally Stimulating", InventorSpot.com [online], [retrieved Apr. 21, 2011]. Retrieved from the Internet <URL: http://inventorspot.com/articles/nokia_files_patent_make_phones_digitally_stimulating>.

Marks, Paul, "Nokia touchscreen creates texture illusion", New Scientist [online], [retrieved Apr. 21, 2011]. Retrieved from the Internet <URL: http://www.newscientist.com/article/dn19510-nokia-touchscreen-creates-texture-illusion.html>.

International Search Report and Written Opinion as issued for International Application No. PCT/US12/33743, dated Jul. 6, 2012.

Japanese Patent Office, Office Action, Application No. 2014-506471 dated Apr. 15, 2016.

European Extended Search Report mailed Jan. 22, 2015 for corresponding European Application 12773915.9.

Chinese Office Action mailed Sep. 6, 2015 for corresponding Chinese Application 201280025757.5.

State Intellectual Property Office of the Peoples Republic of China, Notification of the Second Office Action, Application No. 201280025757 dated May 3, 2016.

\* cited by examiner

ELECTRO-VIBROTACTILE DISPLAY

FIELD

The invention relates to an electro-vibrotactile display.

BACKGROUND

Systems that provide haptic effects to users in conjunction with visual and/or audio content are known. It is generally understood that a haptic effect may enhance one or more aspects of the experience of the users associated with the content. Conventional haptic systems generally provide a stimulus only in the form of a mechanical vibration, which may limit the system's interaction with the user.

SUMMARY

According to an aspect of the present invention, there is provided an interface device for providing an overall haptic effect. The interface device comprises a surface configured to output the overall haptic effect. The interface device further comprises an electrostatic device that is coupled to the surface and configured to create a first haptic effect at the surface. The interface device further comprises an actuator that is configured to create a second haptic effect at the surface. The overall haptic effect comprises the first haptic effect and the second haptic effect.

According to an aspect of the present invention, there is provided a method of providing an overall haptic effect. The method comprises generating with an electrostatic device a first haptic effect at a surface of an interface device and generating with an actuator a second haptic effect at the surface. The overall haptic effect comprises the first haptic effect and the second haptic effect.

According to an aspect of the present invention, there is provided a system configured to provide a haptic effect through an electrostatic display. The electrostatic display is configured to output a haptic effect that may simulate a level of friction or texture on the surface of the display, even when the surface is smooth. The electrostatic display can output different haptic effects to simulate different coefficients of friction or texture in order to convey a topography depicted on the display. In an embodiment, the haptic effect may simulate a coefficient of friction or texture that conveys the terrain of a material. In an embodiment, the haptic effect may simulate a coefficient of friction or texture that conveys a height or depth of a location of the display. In an embodiment, the haptic effect may convey a property of data at a location on the display. A sensor may measure the simulated coefficient of friction and may adjust the haptic effect based on the measured coefficient.

According to an aspect of the present invention, there is provided a system that changes the haptic effect based on the impedance measured at the surface of the electrostatic display. In an embodiment, the system measures differences in the impedance of users' fingers due to differences in users' skin thicknesses, finger sizes, or moisture levels on their fingers. The system adjusts the haptic effect for these differences in order for create stimuli that the system may expect to be experienced consistently by two or more users.

According to an aspect of the present invention, there is provided an electrostatic display with actuators, with a non-moving effect generator, such as a thermal device, or with both.

An aspect of the invention relates to generating a haptic effect on surfaces other than the display screen of the electrostatic display. In an embodiment, a haptic effect may be generated on the side or back of the display device, where controls such as a slide bar may be located. Other surfaces include those of, for example, a steering wheel, a dashboard, a joystick, a touchpad (or trackpad), and a remote control. In an embodiment, a haptic effect may be generated at locations on a touchpad that correspond to locations on a display, in order to convey features shown on the display.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1A:
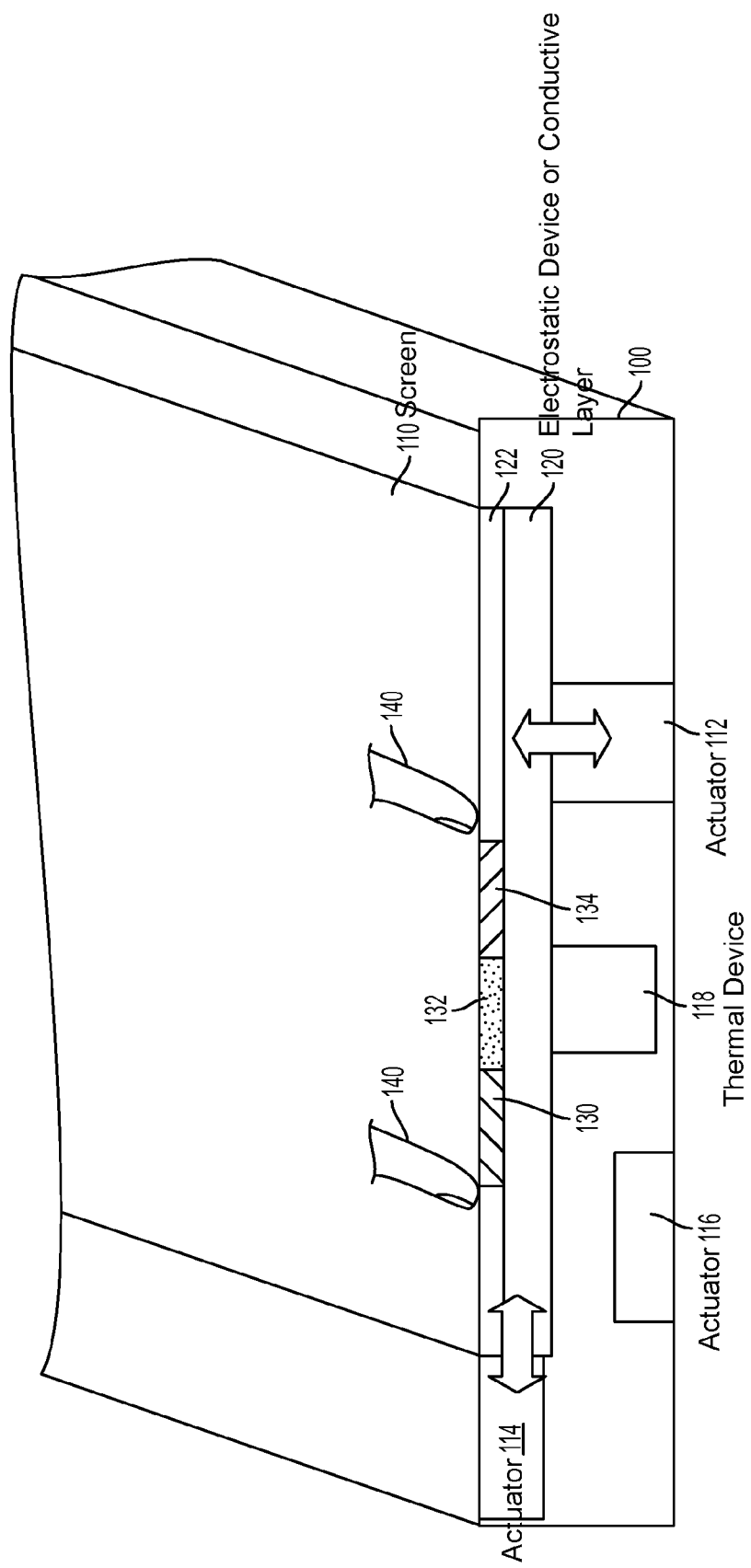
FIG. 1A illustrates a system configured to generate a haptic effect with actuators and an electrostatic device, according to one or more embodiments of the invention.

FIG. 1 illustrates one embodiment of a system 100 that provides a haptic effect which simulates a friction coefficient at a user interface. A haptic effect refers to a stimulus or force, including but not limited to a vibration, an attractive or repulsive force, a voltage or current, some other mechanical or electromagnetic force, heating or cooling, or some other stimulus. The haptic effect may comprise one or a combination of the forces or stimuli described herein. A plurality of haptic effects may be combined to form an overall haptic effect. The haptic effect may be outputted at a user interface to provide feedback to a user or object interacting with the interface. It may provide the feedback through mechanical movement, such as through vibrations of a solid object, vibrations of fluids, or actuating objects like pins or rods to touch the user. The pins or rods may deform the surface by changing the surface relief or contour. The overall haptic effect may also provide feedback through electrostatic interactions, either to generate a force on an object, like a finger at the user interface, or to send an electric signal to an object that can perceive the signal, like a nerve of the finger or a sensor in a stylus.

The system may be, for example, part of a music player, a video player, a graphic display, an e-book reader, some combination of the devices, or may be some other general device with a user interface. The system 100 in this embodiment interfaces with the user through a display screen 110 that is configured to sense an object that is touching the screen 110. The object may be a user's finger 140, a palm of the user's hand, or any other part of the user's body that can sense a haptic effect. The object may also be a stylus or some other device whose presence can be sensed on the screen 110. The screen may sense the presence of the object through capacitive, resistive, or inductive coupling, but is not limited to those techniques.

The system 100 may provide a haptic effect at the surface of the display screen 110 through one or more actuators 112, 114, 116, through an electrostatic device 120, or through combinations thereof. The actuators 112, 114, and 116 are configured to generate mechanical motion that may translate into vibrations at the surface of the screen 110. The actuators may be implemented as piezoelectric actuators, voice coils, magnetic actuators such as solenoids, pneumatic actuators, ultrasonic energy actuators, an eccentric mass actuator, an electroactive polymer actuator, a shape memory alloy, or some other type of actuator. The actuators may rely on motors that convert torque into vibrations, on fluid pressure, on changes in the shape of a material, or on other forces that generate motion. For example, the actuators may use the electrostatic attraction between two objects, such as a conductive layer 120 and insulating layer 122 discussed below, or between layers in an electrostatic surface actuator, to generate motion. Further, the actuators are not limited to generating vibrations, but may instead generate lateral motion, up and down motion, rotational motion, or some combinations thereof, or some other motion. For the embodiment in FIG. 1A, actuator 116 may be a piezoelectric or a voice coil actuator that generates vibrations to generate a haptic effect, actuator 112 may be a solenoid that generates up and down motion to generate a haptic effect, and actuator 114 may be a pneumatic actuator that generates lateral motion to generate a haptic effect. The actuators may all be activated when a haptic effect is desired, or only one may be activated to conserve power or to generate different haptic effects. Further, a particular actuator may be positioned and be configured to generate a haptic effect for the entire system 100, for only the display screen 110 that interfaces with the user, for only a portion of the display screen, or on some other part of the system 100. For example, the actuator 116 can be configured to generate vibrations for only its corner of the display screen 110 by keeping the level of vibrations low enough so that vibration amplitude outside of its corner is less than a threshold amplitude.

The system 100 also provides a haptic effect through an electrostatic device. The electrostatic device may be an electrovibrotactile display or any other device that applies voltages and currents instead of mechanical motion to generate a haptic effect. The electrostatic device in this embodiment has at least a conductive layer 120 and an insulating layer 122. The conducting layer 120 may be any semiconductor or other conductive material, such as copper, aluminum, gold, or silver. The insulating layer 122 may be glass, plastic, polymer, or any other insulating material. The system 100 may operate the electrostatic device by applying an electric signal to the conducting layer 120. The electric signal may be an AC signal that, in this embodiment, capacitively couples the conducting layer with an object near or touching the display screen 110. The AC signal may be generated by a high-voltage amplifier. The system 100 may also rely on principles other than capacitive coupling to generate a haptic effect. The capacitive coupling may simulate a friction coefficient or texture on the surface of the display screen 110. A coefficient of friction is a simulated one in that while the display screen 110 can be smooth, the capacitive coupling may produce an attractive force between an object near the screen 100 and the conducting layer 120. The attractive force increases the friction on the surface even when the structure of the material at the surface has not changed. Varying the levels of attraction between the object and the conducting layer can vary the friction on an object moving across the display screen 110. Varying the friction force simulates a change in the coefficient of friction. The simulated coefficient of friction may be changed by the actuators as well. For example, the actuators may increase the friction force by generating vibrations, or by changing the surface relief of the display screen 110 to change the actual coefficient of friction.

The capacitive coupling may also generate a haptic effect by stimulating parts of the object near or touching the display screen 110, such as corpuscles in the skin of a user's finger 140 or components in a stylus that can respond to the coupling. The corpuscles in the skin, for example, may be stimulated and sense the capacitive coupling as a vibration or some more specific sensation. For example, the conducting layer 120 can be applied with an AC voltage signal that couples with conductive parts of a user's finger 140. As the user touches the display screen 110 and moves his or her finger 140 on the screen, the user may sense a texture of prickliness, graininess, bumpiness, roughness, stickiness, or some other texture. The user's skin corpuscles may also be stimulated to have a general sensation as the finger 140 moves across the screen 110. Therefore, the capacitive coupling may be used to simulate a coefficient of friction or texture by generating a signal that couples with an object near or touching the screen.

To provide the same attractive force or to provide the same level of stimuli across many different objects or persons, the system 100 may also include a sensor that can measure the impedance at the surface of the display screen 100. The sensor may measure the impedance by applying a pulse across the surface and measuring the surface voltage or by measuring the strength of the capacitive coupling. The sensor may use other known techniques for measuring impedance, and may compensate for varying ambient conditions such as the moisture in the air or temperature. The haptic effect can be adjusted based on the impedance of a person. For example, a more forceful haptic effect may be applied to an object with a higher impedance and a less forceful effect for one with lower impedance.

In an embodiment, a user interface does not have an insulating layer, so that an object can directly touch the conducting layer. A haptic effect can be generated by passing an electrical current from the conducting layer to the object. This embodiment may alternatively use an insulating layer, but include one or more electrodes in the insulating layer that can pass current to objects that touch the electrode as they move across the insulating layer.

In an embodiment, a haptic effect system may include a thermal device 118 that may be combined with the actuators and electrostatic device. The thermal device 118 may generate a haptic effect by directly or indirectly heating or cooling an object interacting with the system.

The haptic effects can be generated by actuators and electrostatic device one at a time, or can be combined. For example, a voltage may be applied to the conducting layer 120 at a level high enough to both attract the skin of a finger 140 touching the screen 110 and to stimulate corpuscles within the skin. Simultaneous to this electro-vibrotactile haptic effect, electrostatic forces may be produced on the conducting layer 120 and the insulating layer 122 to create mechanical motion in those layers. The haptic effects may be combined with motions generated by one or a combination of actuators 112, 114, and 116. The devices may work together to simulate the coefficient of friction or texture on the surface of the screen. The actuators may generate vibrations, for example, to also simulate changes in the surface friction or texture.

The devices can generate different simulated textures or coefficients of friction as an object, like a user's finger 140, moves across the surface of the screen 110. FIG. 1A shows a first haptic region 130, a second haptic region 132, and a third haptic region 134, but other embodiments may have one, two, or more than three haptic regions. As the user's finger moves over the first region 130, the actuators and electrostatic device may simulate a first texture or friction coefficient. As the user's finger moves on to the second and third regions 132, 134, the actuators and electrostatic devices may simulate second and third textures or friction coefficients, respectively, that can be different from the first texture or friction coefficient.

The system may also have a sensor that measures the simulated coefficient of friction. This may be the same sensor as the sensor described above that measures the impedance, or it may be a different sensor. The sensor may measure the simulated coefficient based on a measured pressure that the surface of the screen 110 is receiving, such as from an object touching the screen, and on the movement of the object at the surface. Movement of the object may be measured based on how the pressure at the surface changes over time and over locations on the surface. For example, the sensor may calculate a value representing the simulated coefficient of friction based on an acceleration of a user's finger on the screen 110 and on the pressure that the surface receives from the user's finger.

The haptic effects and the sensors may be controlled by a controller. The controller may analyze the impedance, the simulated coefficient of friction, the surface pressure, a rate of movement measured at the surface, and other factors to determine whether there has been a triggering condition for a haptic effect or how forceful a haptic effect should be. Details of the controller are discussed below.

Figure 1B:
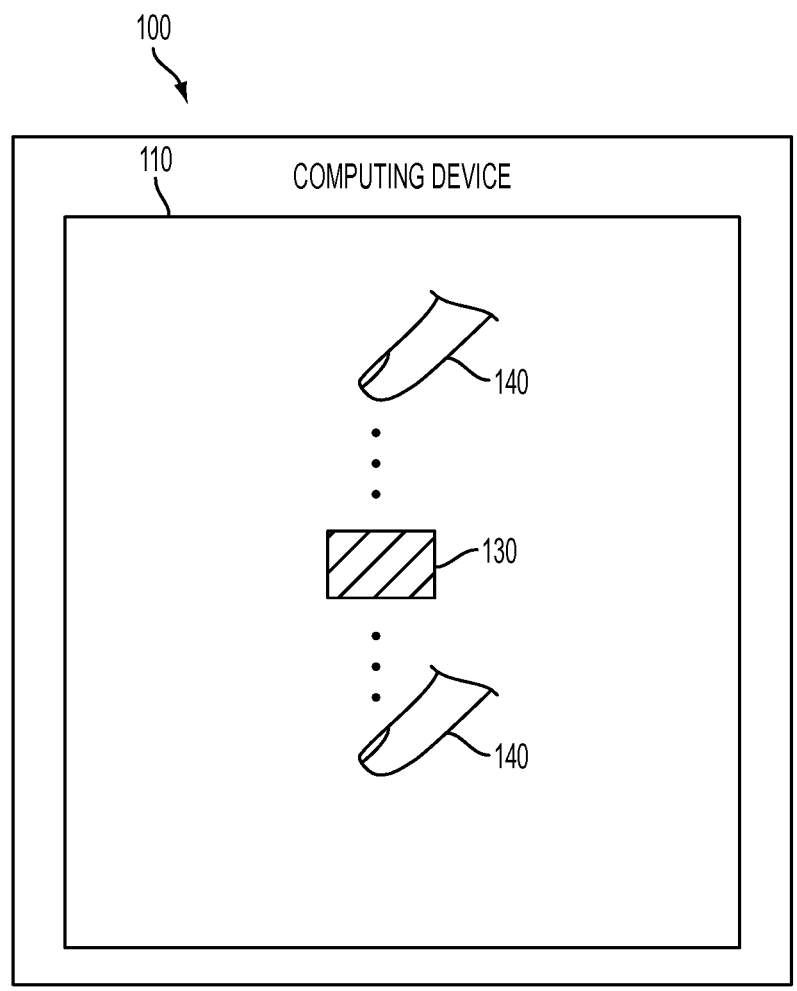
FIG. 1B illustrates another view of the system of FIG. 1A.

A frontal view of the haptic effect system of FIG. 1A is illustrated in FIG. 1B, which shows the haptic region 130 with a simulated friction coefficient or texture. As the user moves a finger 140 over the region, the actuators and electrostatic device may generate a haptic effect that simulates a friction force corresponding to the simulated friction coefficient. The area of a haptic region can be much smaller or much bigger than that shown in FIGS. 1A and 1B, and its associated coefficient of friction or texture may change.

Figure 2:
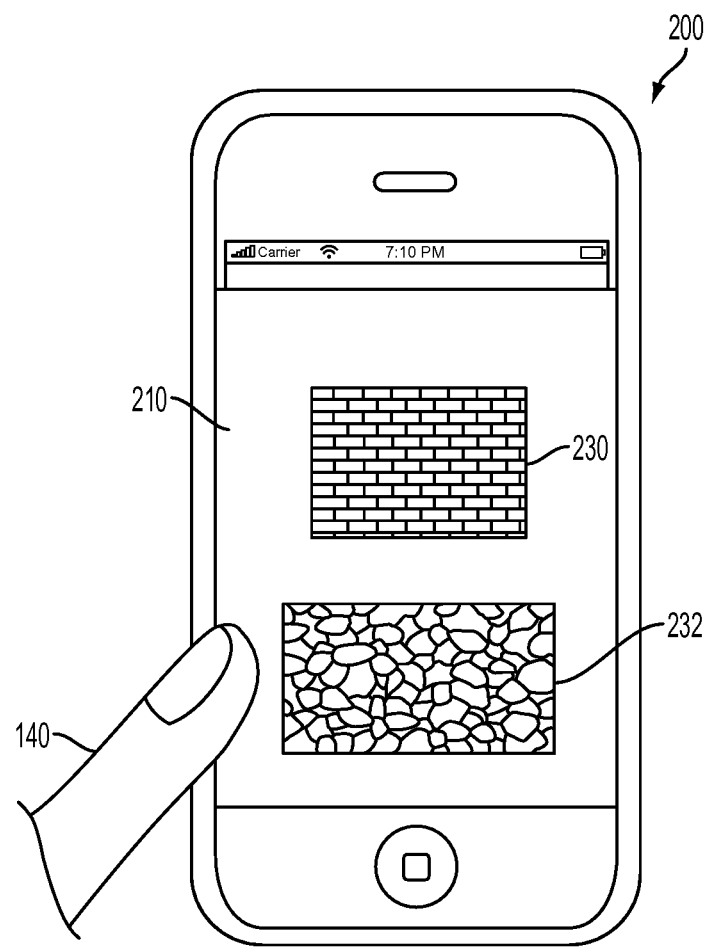
FIG. 2 illustrates a system configured to generate a haptic effect to simulate a texture, according to one or more embodiments of the invention.

FIG. 2 shows an embodiment of a haptic effect system 200. The system 200 is configured to provide a user interface through a display screen 210. The display screen 210 has a haptic region 230 that may simulate the coarse texture of bricks as a user's finger 140 moves across the region. The display screen 210 also has another haptic region 232 that simulates the bumpy texture of rocks as the user's finger 140 moves across the region. The system may generate haptic effects that simulate other textures, such as stickiness, roughness, or abrasiveness. The haptic effects may incorporate the heating or cooling from a thermal device to simulate both the texture and temperature.

Figure 3:
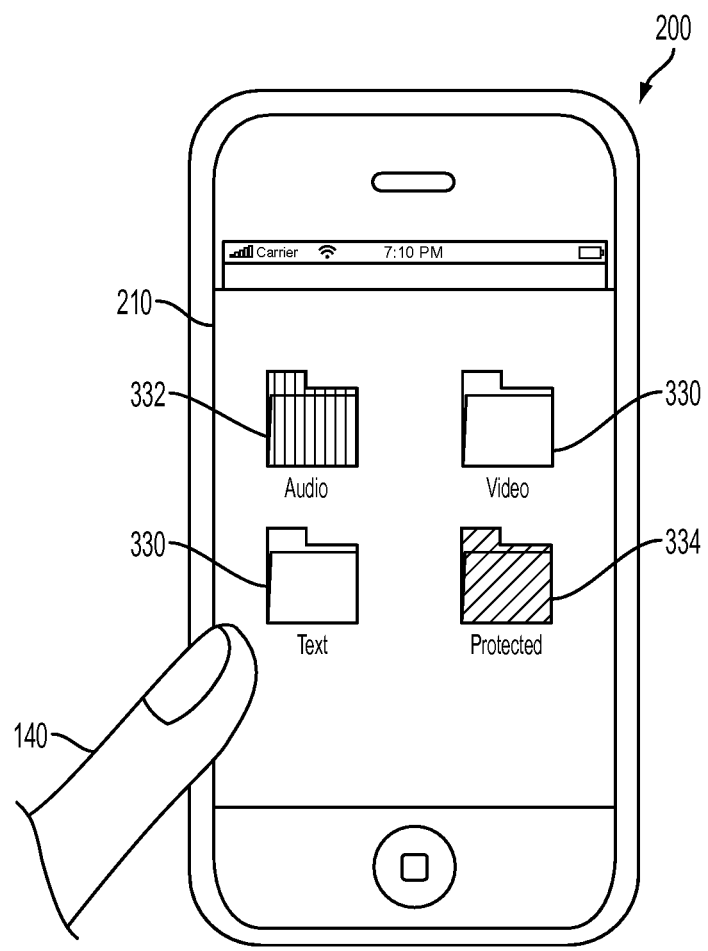
FIG. 3 illustrates a system configured to generate a haptic effect corresponding to one or more data elements, in accordance with one or more embodiments of the invention.

FIG. 3 shows another form of interaction that the haptic effect system 200 can provide. The system 200 can generate haptic effects to represent data elements such as file folders. The screen 210 may have three haptic regions 330, 332, and 334 that simulate different textures or coefficients of friction for different types of folders. For example, the system 200 may provide a less forceful or no haptic effect when a user's finger 140 moves across region 330, which corresponds to folders representing visual data. The system 200 may provide a more forceful haptic effect when a user's finger 140 moves across region 332, which corresponds to a folder representing audio data, and finally may provide an even more forceful haptic effect when a user's finger moves across region 334, which corresponds to a folder representing protected data. The haptic regions can correspond to many different types of data elements, such as buttons, checkboxes, dropdown boxes, other form elements, icons, cursors, and windows. The system 200 may change the texture or friction coefficient of a region based on time. For example, if a haptic region corresponds to a button, the system 200 may change the texture or friction coefficient of the region between the first time and the second time that a user's finger 140 moves across the region. This change can reflect, for example, that the button has been depressed.

Figure 4:
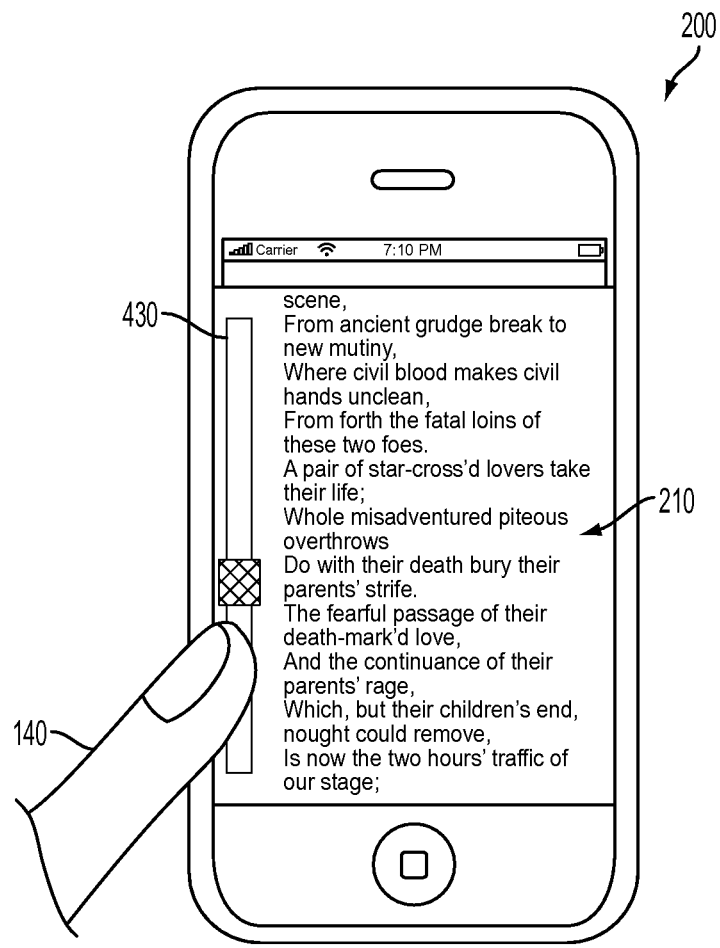
FIG. 4 illustrates a system configured to generate a haptic effect corresponding to one or more data elements, in accordance with one or more embodiments of the invention.

Another example of a data element is shown in FIG. 4. Here, a haptic region 430 corresponds to a slide bar (or scroll bar). As the user's finger 140 moves across the region, the system 200 can generate a haptic effect that simulates a texture or friction coefficient so long as the finger 140 is still in the region. The system 200 may localize the haptic effect to the region on the slide bar where the finger is located. For example, the system 200 may have a plurality of actuators at different locations under the screen 210, and it may activate only the actuator nearest to the finger 140.

The system 200 may also be configured to adjust the haptic effect to adjust the simulated texture or coefficient of friction. That is, a user may configure the system 200 to have a high simulated friction of coefficient in order to achieve more control while scrolling down the screen with the slide bar. The system may also automatically adjust the haptic effect based on, for example, the motion of the finger 140.

For example, if the user's finger is attempting to scroll quickly, the system 200 may accommodate the user by sensing a high rate of motion on the screen and generating a less forceful haptic effect to simulate a lower coefficient of friction.

Figure 5:
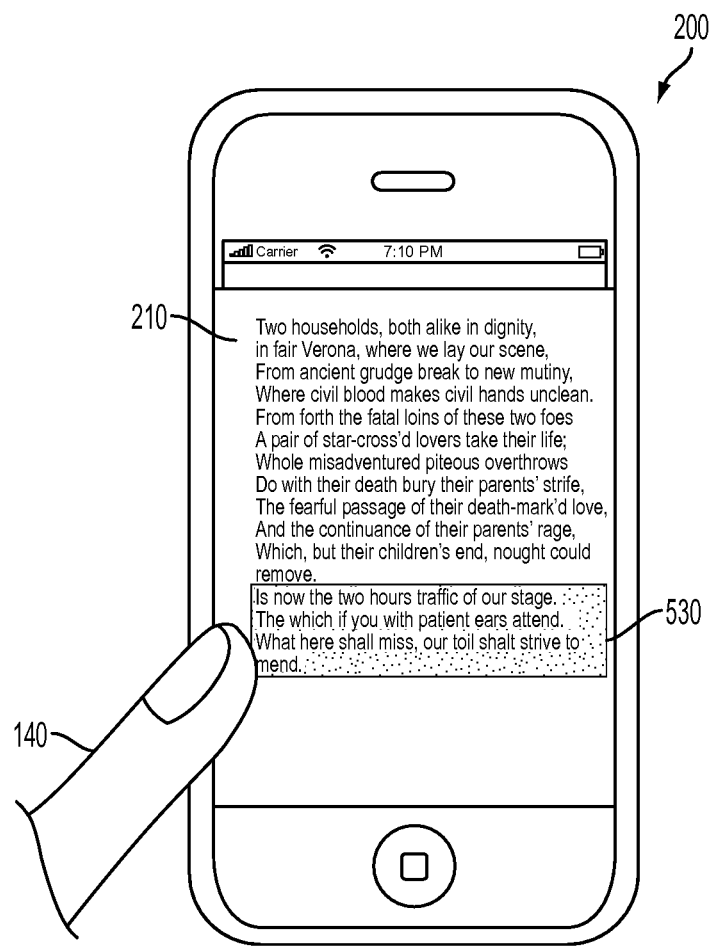
FIG. 5 illustrates a system configured to generate a haptic effect corresponding to one or more data elements, in accordance with one or more embodiments of the invention.

FIG. 5 shows an example that corresponds a haptic region to properties of text. The particular embodiment shows a haptic region 530 that corresponds to highlighting of text. The haptic region may instead correspond to underlined, italicized, bolded text, to text of a certain font, or any other property that can be attributed to the text. Further, the haptic region may be assigned or modified as property is applied to the text. For example, the system may generate a haptic effect as the user is in the process of highlighting text.

The haptic region can correspond not to just visible properties of text, but also to invisible properties, such as metadata. For example, the system 200 may assign a haptic region to text that is a hyperlink. In another example, the system 200 may access a XML file to identify certain text that belongs to a certain section and assign a haptic region to that section. As discussed earlier, the friction coefficient of a region can change based on time or on movement on the screen. In this instance, when a user's finger 140 scrolls text to a different location on the screen 210, the system 200 is configured to effectively move the haptic region to the text's new location by setting a new simulated friction coefficient at the new location and, for example, setting the simulated friction coefficient at the old location to zero or some default value.

Figure 6:
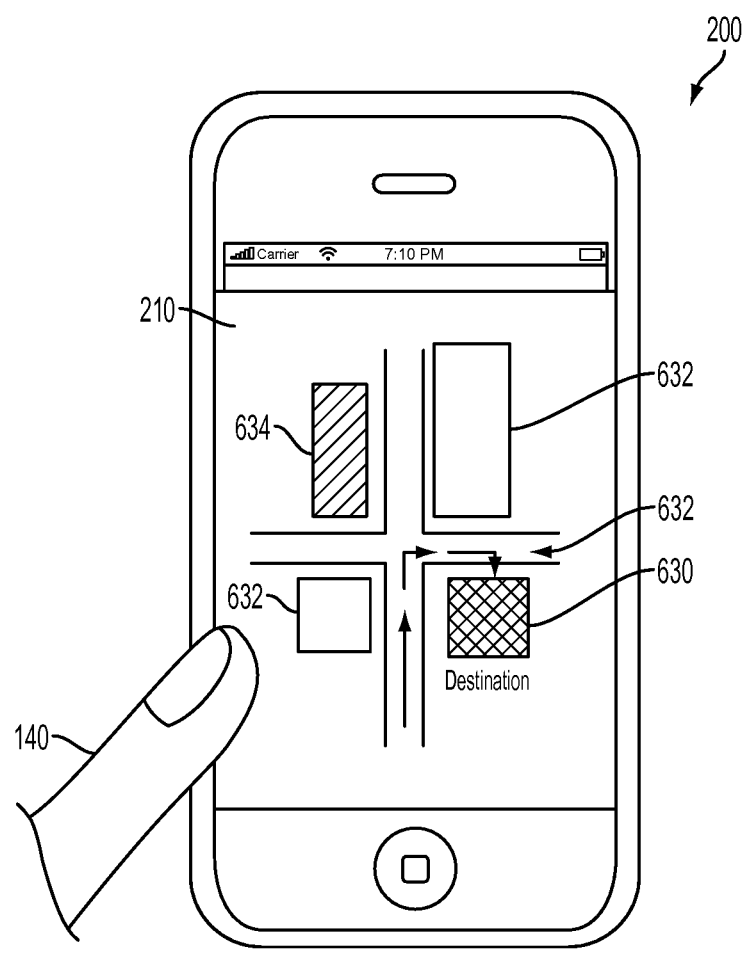
FIG. 6 illustrates a system configured to generate a haptic effect corresponding to map locations, according to one or more embodiments of the invention.

FIG. 6 shows yet another example that corresponds a haptic region to a location. In the embodiment, haptic regions 632 may correspond to locations that have no particular relevance to a user and have a zero or some default simulated coefficient of friction. Haptic regions 630 and 634 may have different simulated textures or coefficients of friction that distinguish two different locations. The friction coefficients may act as an identifier for the location. The system 200 may also generate a haptic effect that produces a texture or friction force that simulates the terrain at the location. For example, the haptic effect at haptic region 630 may simulate the texture of a sand lot, while the haptic effect at haptic region 634 may simulate the texture of a gravel track. The haptic effect is not limited to simulating the texture of terrain. For example, the screen 210 may display garments, textiles, foods, and other materials and products. The system 200 can assign a haptic region that corresponds to the material or product displayed and generate a haptic effect that produces a texture or friction force that simulates that material or product.

The haptic effect may be generated to simulate textures in drawings in general. For example, if the user's finger 140 were drawing on a drawing program rendered on the display screen 210, the system may generate a haptic effect that produces a texture that simulates, for example, the texture of crosshatches when a user's finger 140 is drawing crosshatches on the screen or a grainier texture when a user's finger 140 is drawing spray paint on the screen.

Figure 7:
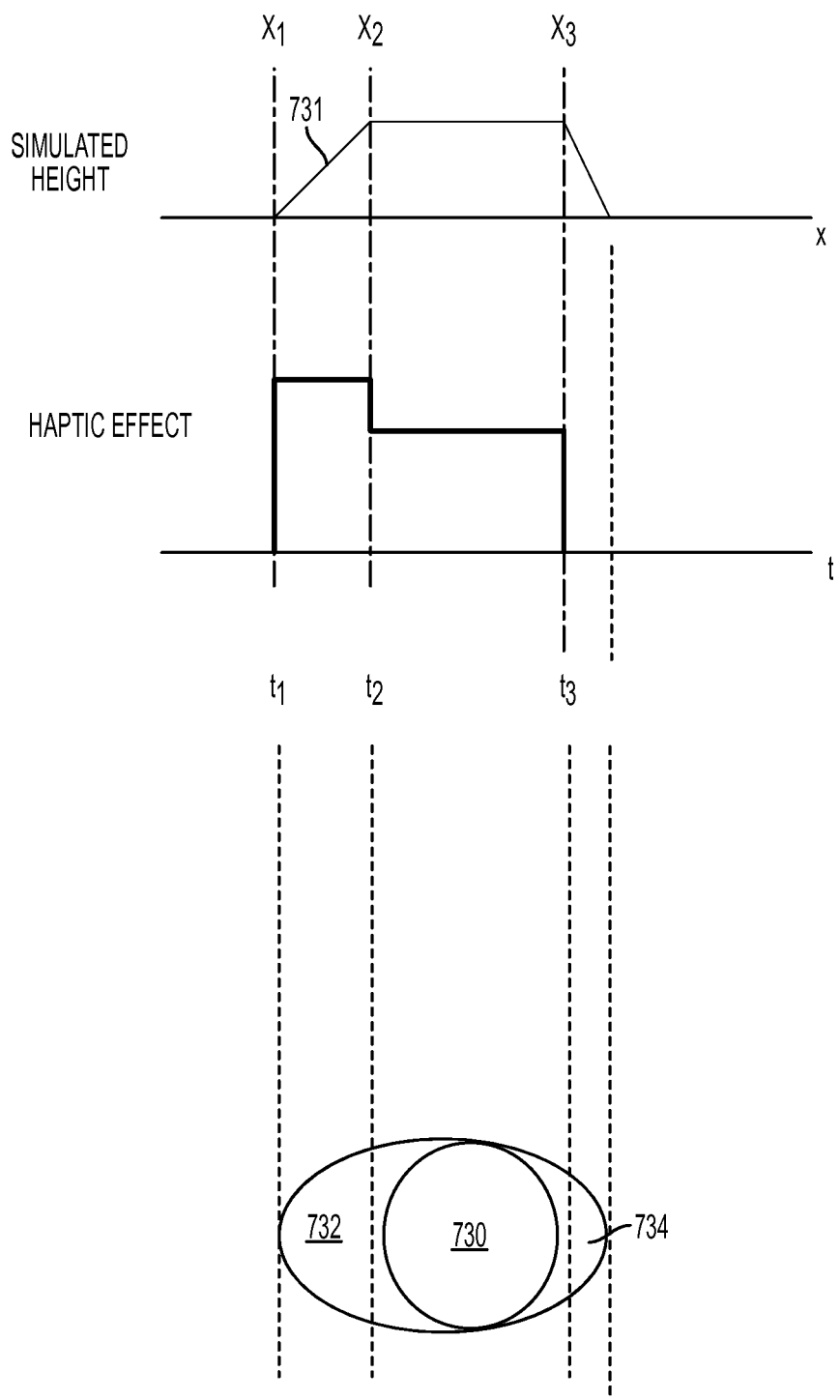
FIG. 7 illustrates a depiction of how height may be simulated with a haptic effect, in accordance with one or more embodiments of the invention.

FIG. 7 shows a simulation of a surface feature, specifically a raised edge. In the embodiment, the simulated raised edge 731 may represent three-dimensional aspects of areas depicted on a screen, such as buttons, textboxes, icons, or other user input objects. For example, users who perceive the simulated raised edge of a button may know that their finger has moved over the top of the button without having to look at the screen. The simulated surface features may more generally convey height or depth at the user interface.

The raised edge 731 may be defined by a time domain profile that applies a more intense haptic effect when a user's finger 140 is over haptic region 732, a less intense haptic effect when the user's finger 140 is over haptic region 730, and no haptic effect when the user's finger 140 is over haptic region 734. For example, a haptic effect system may simulate a high friction coefficient when the user's finger 140 moves over region 732 in order to represent the rising slope of the raised edge 731. The haptic system may simulate a second, lower friction coefficient when the user's finger 140 moves over region 730 in order to represent the flat top of an object. The haptic system may simulate an even lower coefficient of friction (e.g., zero) when the finger 140 moves over region 734 to represent a down slope. By detecting whether a user's finger is moving toward region 730, which corresponds to a rising edge, or whether the user's finger is moving away, which corresponds to a descending edge, the system can vary the haptic effect to simulate a higher coefficient for the rise and a lower coefficient for the descent. Although the embodiment describes a time domain profile that varies the haptic effect over time, time is not an independent variable. Rather, the timing of the haptic effect depends on the position of the finger 140. Therefore, the haptic effects in the time domain profile is not always applied at fixed times, but may depend on how quickly a user's finger is approaching the haptic regions 730, 732, and 734.

To more generally convey height or depth at the user interface, a topography map may be used to assign haptic regions and friction coefficients to locations on the user interface. The haptic regions are not limited to two simulated friction coefficients, but may have more or fewer coefficients. More coefficients may be used to adjust the simulated friction based on the direction in which a user's finger is moving. For example, if a user's finger is approaching region 730 from a direction that corresponds to north, the system may apply one friction coefficient, whereas it may apply a different friction coefficient if a user's finger is approaching from a direction that corresponds to west. Having multiple coefficients can effectively subdivide the region 732 into separate sub-regions that correspond to different slopes. The system may also be configured to calculate the slope based on, for example, a topographical map by dividing the height difference between two levels in the map by the horizontal distance between the two levels. For images displayed on a screen, the system may also be configured to calculate height differences in the image based on, for example, lighting differences, location of shadows, and other visual factors that can be used to measure height differences in an image. The system may incorporate height and terrain information to generate a haptic effect that simulates both the topography and texture of an object, of a terrain, or of some other type of image shown on the user interface.

Actuators may also be used to change the perception of height or depth. For example, they may generate vibrations to signal a change from a region representing a slope to a region representing a plateau. Alternatively, the actuators may actually create height or depth by using, for example, rods or pins to change the surface relief.

Figure 8A:
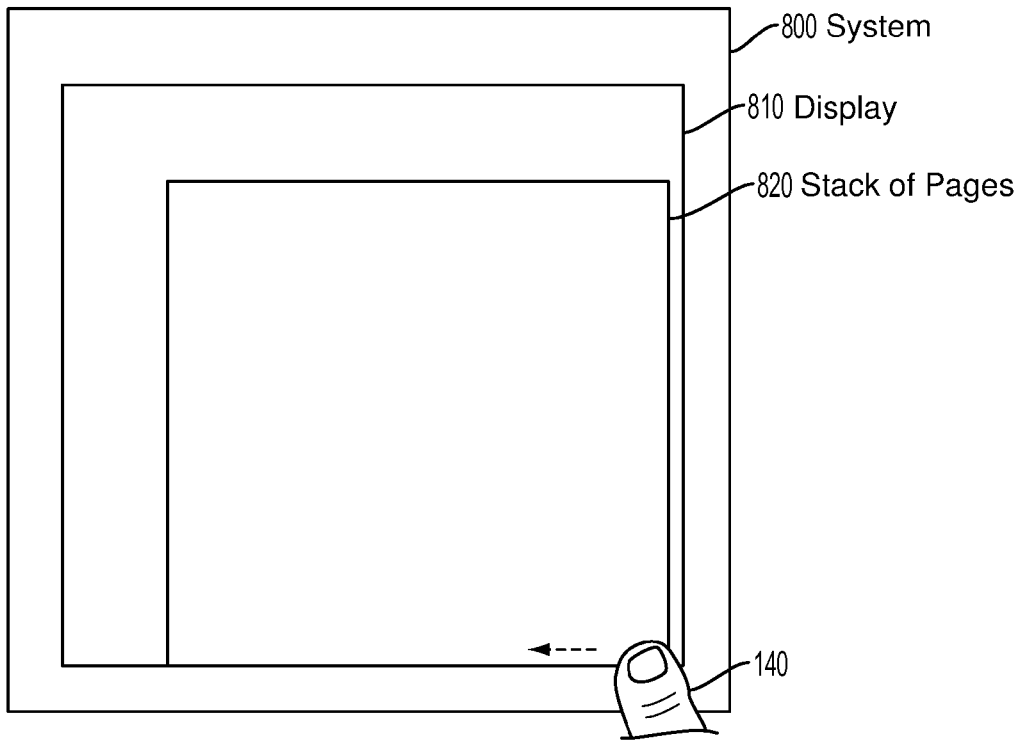
FIGS. 8A and 8B illustrate a system configured to generate a haptic effect based on a user gesture, in accordance with one or more embodiments of the invention.
Figure 8B:
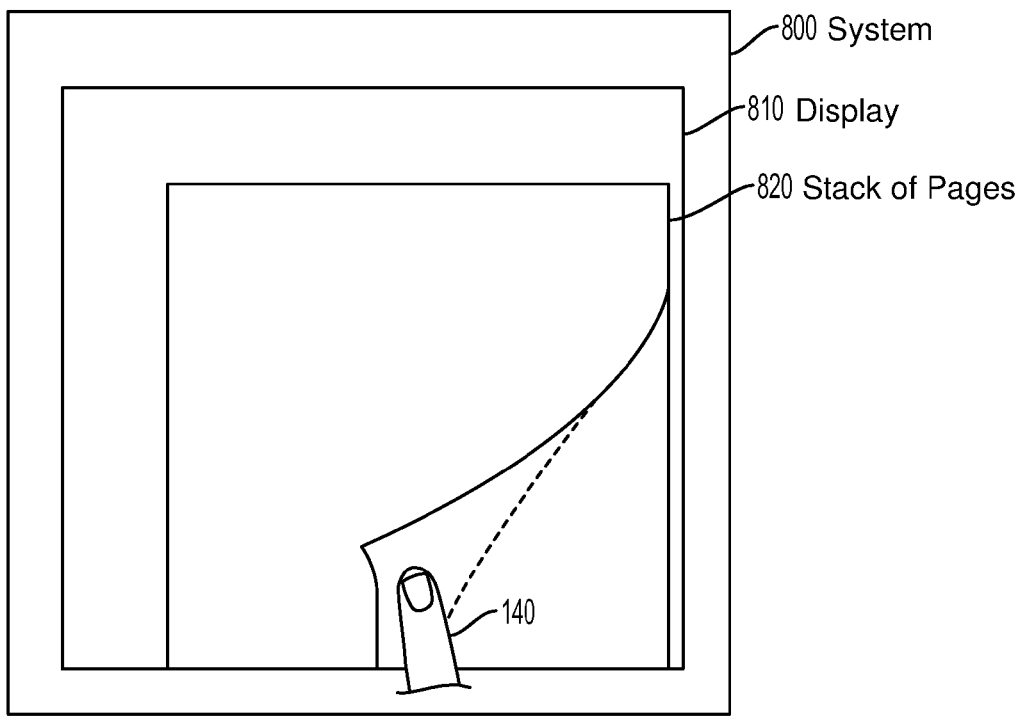

Haptic effects may be generated based not only on the measured surface pressure and rate of movement from an object at the surface, but more specifically on recognized gestures. FIGS. 8A and 8B show a haptic effect being generated in response to a gesture for flipping a page. The haptic effect system 800 has a display screen 810 that depicts a stack of pages 820 on the screen. Rather than assign a haptic region to a location on the screen 810, the system 800 may generate a haptic effect when it recognizes that the user's finger 140 is flipping a page in the stack 820. For example, the system may detect whether the user's finger starts at the lower right corner of the screen 810 and whether it moves to the left. Once the system 800 depicts the top page being flipped, the system 800 may detect whether the user's finger 140 follows the corner of the page. If it does, the system 800 may recognize this as a gesture for flipping a page and generate a haptic effect. The system can be configured to recognize other gestures, such as a scrolling gesture, a zooming gesture, or any other finger movement that can be recognized. For the zooming gesture, the system 800 may be configured to recognize the movement of more than one finger on the screen 810. The system 800 may also recognize other gestures based on two, three, four, or more fingers, such as a pinching gesture or rotate gesture. The system may also accommodate finger movements from more than one user.

Figure 9:
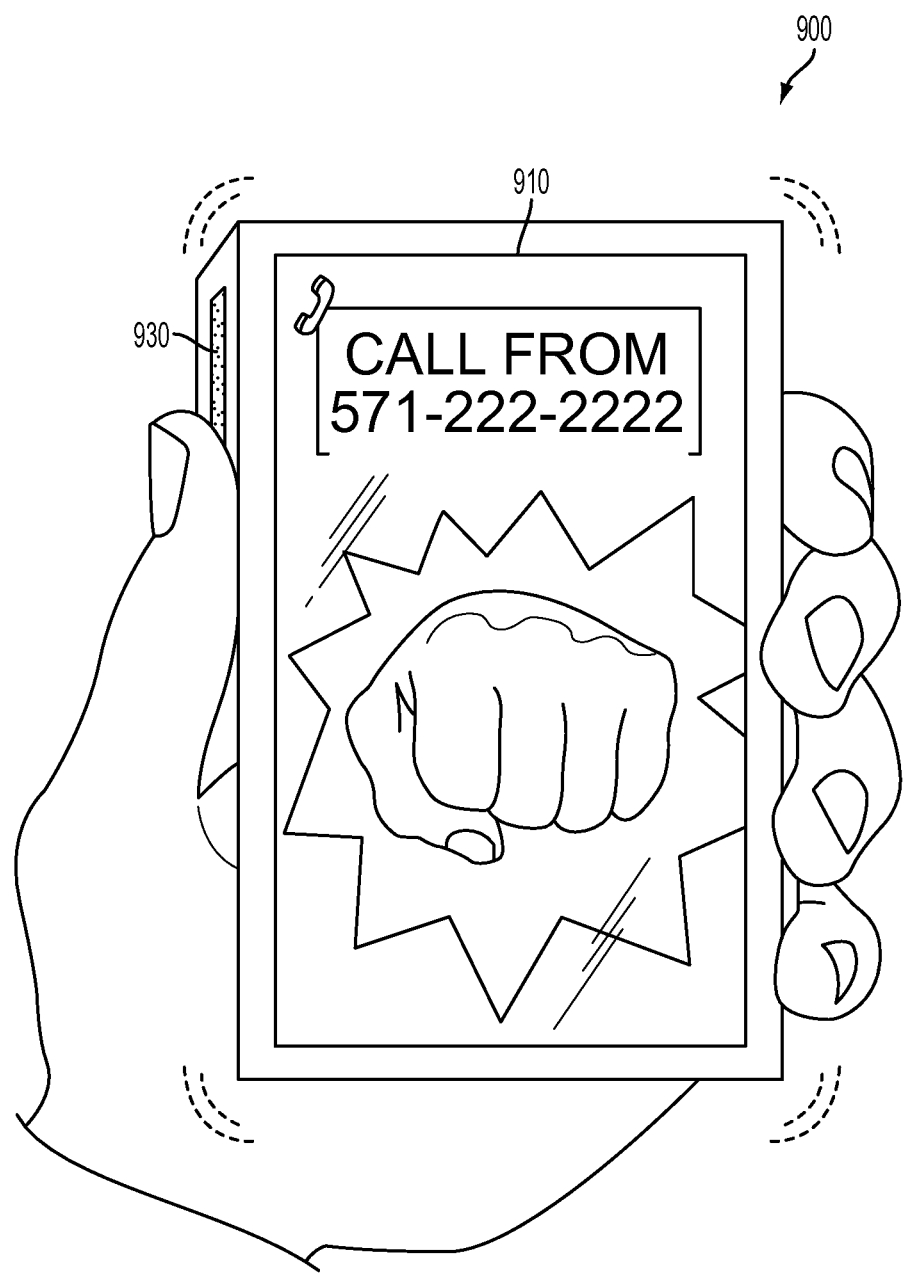
FIG. 9 illustrates a system configured to generate a haptic effect based on a video or audio trigger, in accordance with one or more embodiments of the invention.

A haptic effect may also be initiated based on a video, graphic, or audio content shown at a user interface. FIG. 9 shows a haptic effect system 900 that generates a haptic effect to accompany a visual and audio indication of an incoming phone call. The system 900 may be configured to generate a haptic effect that, for example, simulates a friction coefficient or texture on the screen 910 when it displays the visual indication of a phone call.

Further, haptic effects can be generated on user interface surfaces other than display screens. Because controls for a device can be located on surfaces other than the display screen, the screen does not need to be able to receive user input. Instead, the screen may merely output visual and audio content and haptic effects while a slide bar 930 on a nondisplay surface of the system in FIG. 9, for example, may receive user input. The slide bar may be a control that answers an incoming call. The system may generate a haptic effect without a triggering event. For example, an electrostatic device may apply a constant voltage beneath the slide bar regardless of the presence of a user or triggering event. Alternatively, it may generate a haptic effect only upon a triggering event, like an incoming call.

Figure 10:
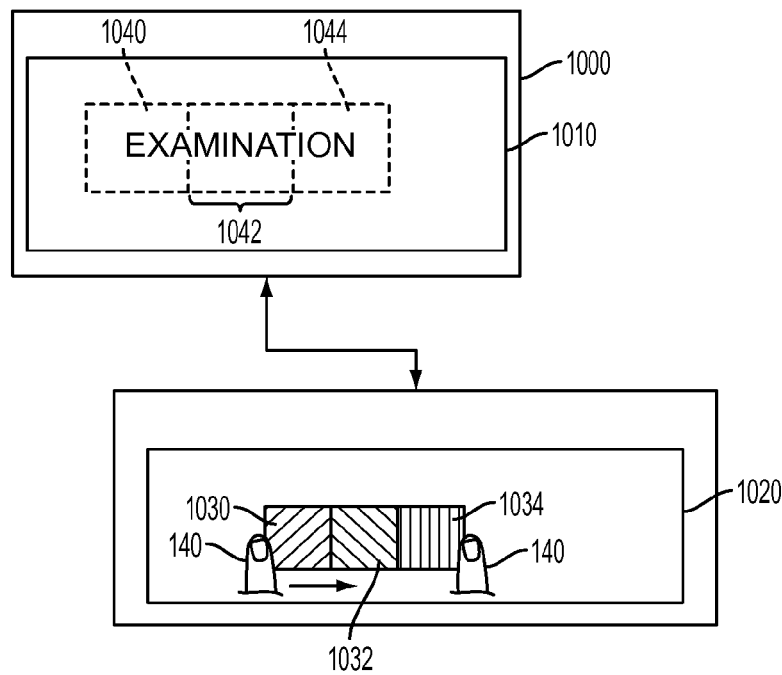
FIG. 10 illustrates a system configured to generate a haptic effect on a nondisplay surface, where the haptic effect conveys a texture, in accordance with one or more embodiments of the invention.

FIG. 10 shows another nondisplay surface 1020. In one example, the surface may belong to a trackpad or a touchpad that provides input to a computer display screen 1010. The computer system 1000 may correspond regions on the screen 1010 to haptic regions on the touchpad 1020. When a user's finger 140 moves across region 1030, for example, the touchpad may generate an output signal that is received by the computing system's display 1010 and reflected as a cursor or pointer moving across region 1040. The touchpad 1020 may also receive an input signal from the computing system 1000 that causes a haptic effect to be generated at haptic region 1030. As the user's finger moves onto regions 1032 and 1034, the touchpad can detect the movement and output a signal to the system 1000 that causes it to show a cursor or pointer to move across corresponding regions 1042 and 1044 on the display screen 1010. At the same time, the system may send a signal to the touchpad 1020 that causes it to generate a first haptic effect as the user's finger 140 is moving across region 1032 and a second haptic effect as the user's finger 140 is moving across region 1034.

Figure 11:
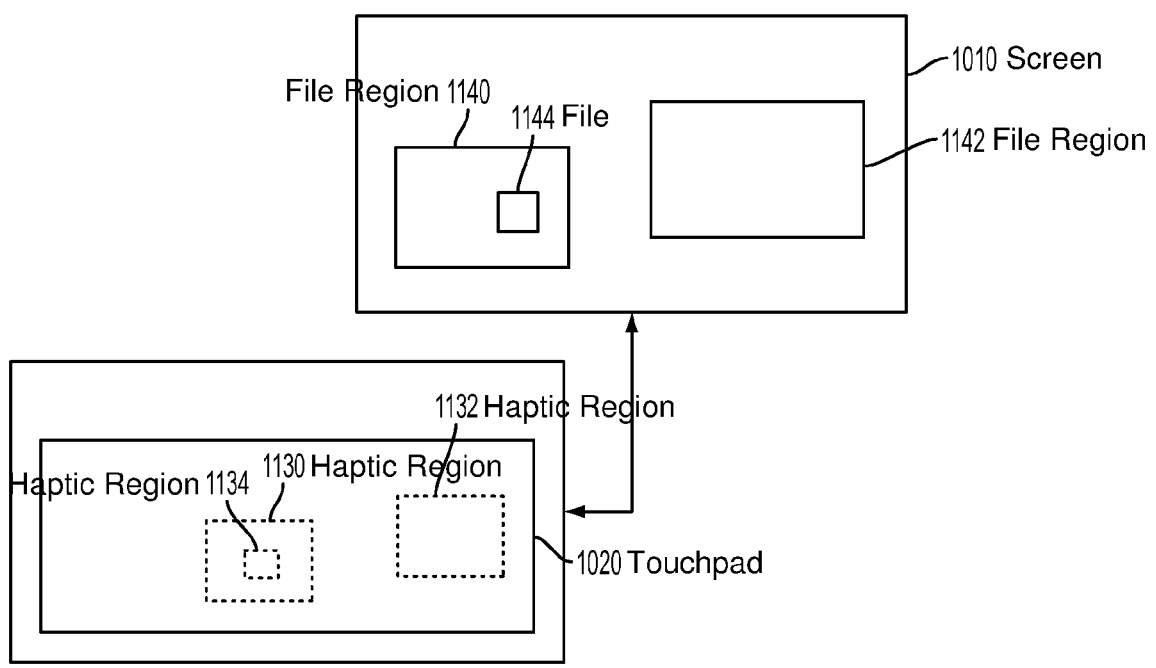
FIG. 11 illustrates a system configured to generate a haptic effect on a nondisplay surface, in accordance with one or more embodiments of the invention.

FIG. 11 shows another example where a haptic region may be in the form of a border region. The embodiment shows a file region 1140 containing one file 1144 and a file region 1142 containing no documents. The file regions may be windows or file folders depicted on the display screen 1010. The system 1000 may assign a haptic region 1130 that corresponds to the border of file region 1140 and may assign a haptic region 1132 that corresponds to the border of file region 1142. The file regions may be locked such that a file cannot be transferred from one region or cannot be written into another region. The haptic regions in FIG. 11 may provide a haptic effect when it detects that a user's finger 140, for example, is moving the file out of region 1140 or into region 1142. That is, the system may generate a haptic effect when the user's finger touches or comes near the edges of regions 1130 or 1132 to indicate to the user that a prohibited action is being attempted. The system 1000 may initiate the haptic effect only if the user is trying to drag a file. For example, the system 1000 may monitor motion at the touchpad 1020 to detect whether a user's finger began its motion at region 1134. If the user's finger began its movement at some other part of the touchpad 1020, the system 1000 may decide against generating a haptic effect.

Figure 12:
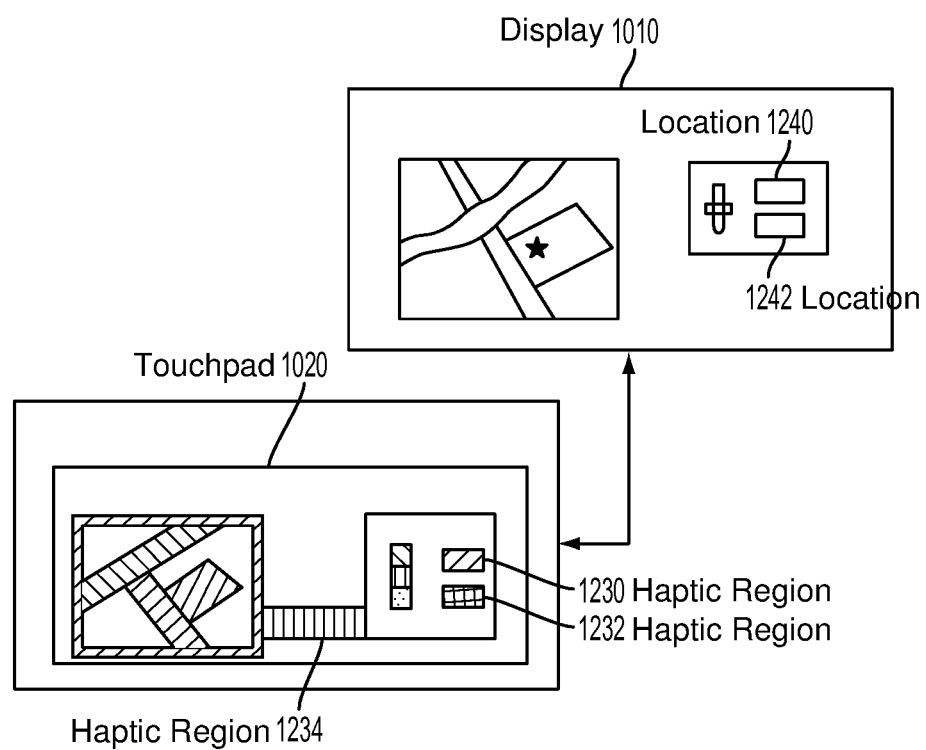
FIG. 12 illustrates a system configured to generate a haptic effect on a nondisplay surface to simulate texture, in accordance with one or more embodiments of the invention.

FIG. 12 shows yet another example where the touchpad 1020 may simulate the friction or texture of locations corresponding to terrain on a screen 1010. Unlike the embodiment shown in FIG. 6, the haptic effect in this embodiment simulates texture on a nondisplay surface like the touchpad 1020. Here, the system 1000 may show a map with a clay tennis court at location 1240 and a hard court at location 1242. The system may assign a haptic region 1230 to correspond with the screen depiction of the clay court 1240, and similarly a haptic region 1232 for the depicted hard court 1242. The system may monitor surface movement and generate a haptic effect to produce a friction force or texture resembling a clay court when a user's finger moves across region 1230, and a friction force or texture resembling a hard court when the finger moves across region 1232. A haptic effect may be generated even for features that are not displayed on the display screen 1010. For example, the system 1000 may assign a haptic region 1234 that may correspond to an underground tunnel that is not displayed on the display screen 1010 or is not visible to the user.

The haptic regions are drawn in FIG. 12 for illustrative purposes, and may not actually be visible. The system 1000 may display a cursor, pointer, icon, or avatar on the screen to allow a user to see how his movement on the touch pad corresponds to movement on the screen.

Figure 13:
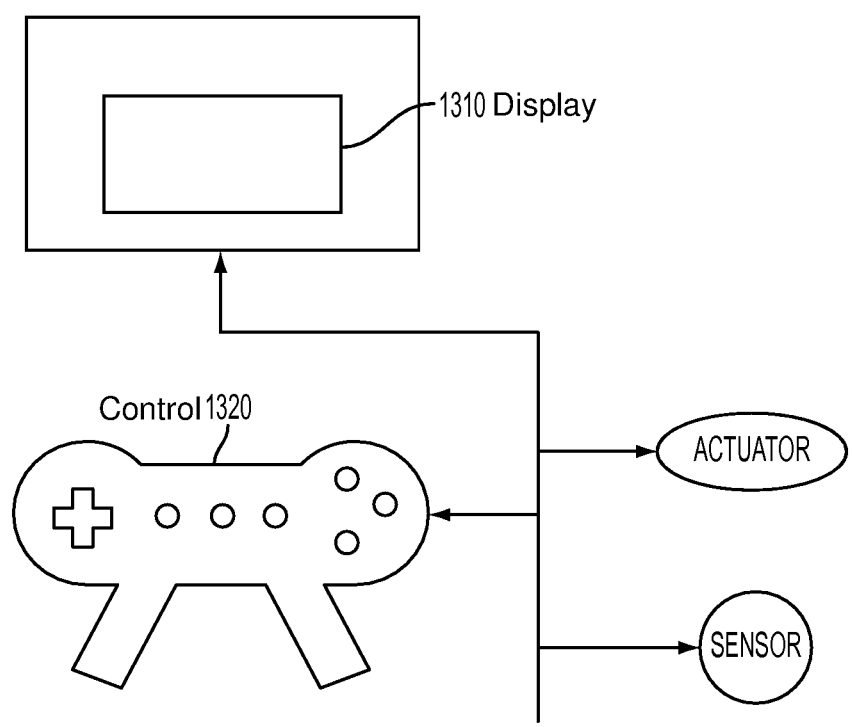
FIG. 13 illustrates a system configured to generate a haptic effect on a nondisplay surface, in accordance with one or more embodiments of the invention.

FIG. 13 shows yet another nondisplay surface, this time on a game remote control 1320, that may output a haptic effect The game remote control 1320 may use actuators, electrostatic devices, thermal devices, or some combination thereof to generate a haptic effect at the surface of the control. The haptic effect may be triggered by an event depicted on a display screen 1310, or an acceleration or velocity of the remote control, the position or orientation of the control 1320 relative to the screen 1310, on a sound, the light level, or some other trigger.

Other triggers may be used for any of the embodiments discussed. Other examples of trigger include the temperature, humidity, lighting, other ambient conditions, and surface contact area (e.g. with another object). These factors may serve as not only triggers, but also as determinants in how forceful a haptic effect is. For example, if a sensor detects dark or low lighting conditions, a more forceful haptic effect may be generated to compensate for the poorer visibility in those conditions.

Further, other nondisplay surfaces may be used. For example, a haptic effect can be outputted on the surface of a switch, a knob, some other control instrument, a dashboard, some other board, or any other surface that can output a haptic effect. In addition, embodiments of the present invention may be used with deformable surfaces, such as surfaces that are adapted for gross deformations.

Figure 14:
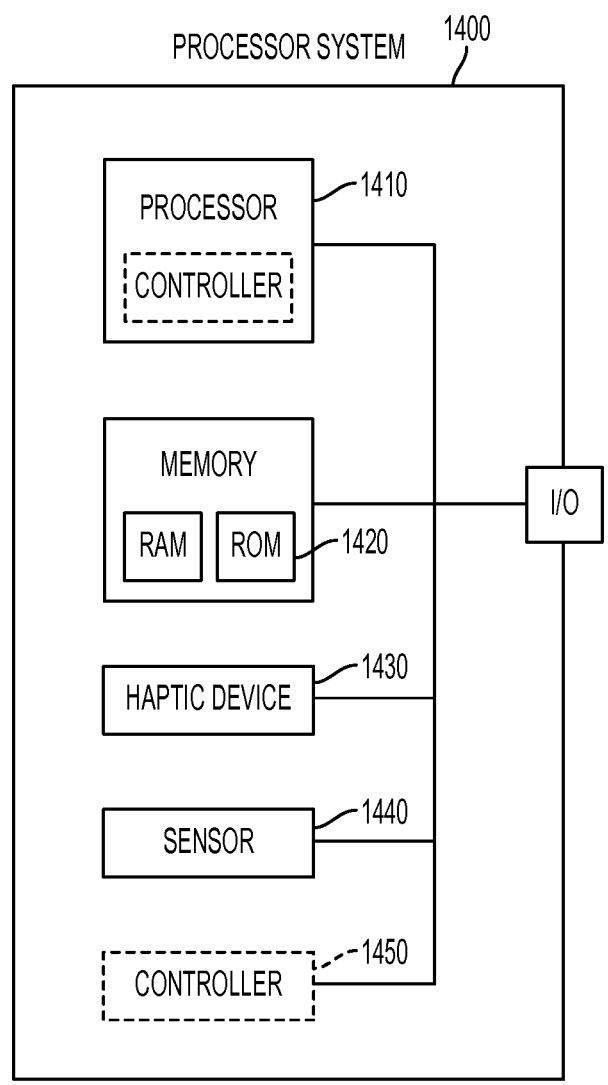
FIG. 14 illustrates a block diagram of a system and its circuits configured to generate a haptic effect, in accordance with one or more embodiments of the invention.

FIG. 14 illustrates an embodiment of a module 1400 for generating a haptic effect. The module 1400 may be included in any of the embodiments of the haptic effect systems described herein. The module 1400 may contain a haptic device 1430 that generates one or more haptic effects, and may adjust the effect based on an impedance or simulated friction coefficient measured by a sensor 1440. The sensor data may be analyzed by a controller 1450 and stored in a memory 1420. The controller 1450 may be included as part of a processor 1410, or the controller may be a separate logic circuit.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An interface device for providing an overall haptic effect, the interface device comprising:
   a surface configured to detect a contact by a user or object interacting with the interface device and transmit a signal associated with the contact;
   a sensor configured to detect an impedance of a body part contacting the surface and transmit a sensor signal associated with the impedance of the body part;
   an electrostatic device coupled to the surface and configured to create a first haptic effect at the surface using a first type of stimulus by generating an electrostatic force between an electrode layer of the electrostatic device and the user or object;
   an actuator separate from the electrostatic device and configured to create a second haptic effect at the surface using a second type of stimulus that is different from the first type of stimulus; and
   a processor in communication with the surface, the sensor, the electrostatic device, and the actuator, the processor configured to:
      receive the sensor signal from the sensor;
      determine a characteristic of the first haptic effect or the second haptic effect based at least in part on the sensor signal;
      transmit a first haptic signal to the electrostatic device configured to cause the electrostatic device to create the first haptic effect; and
      transmit a second haptic signal to the actuator configured to cause the actuator to create the second haptic effect simultaneously to the first haptic effect,
      wherein the overall haptic effect comprises the first haptic effect generated using the first type of stimulus and the second haptic effect generated using the second type of stimulus in order to provide feedback to the user or object interacting with the interface device.

2. The interface device of claim 1, wherein the overall haptic effect comprises at least one of a change in a simulated coefficient of friction, a vibration, a change in a surface relief at the surface, or a texture.

3. The interface device of claim 1, wherein the first haptic effect comprises a simulated coefficient of friction or a texture.

4. The interface device of claim 3, wherein the texture is at least one of roughness, bumpiness, stickiness, fineness, coarseness, or smoothness.

5. The interface device of claim 3, wherein the actuator is configured to change the overall haptic effect by generating the second haptic effect as a vibration or a change in a surface relief of the surface.

6. The interface device of claim 5, wherein the sensor is a first sensor, and further comprising a second sensor configured to detect the contact at the surface and transmit the signal.

7. The interface device of claim 6, wherein the contact comprises changes in pressure over time and over locations on the surface.

8. The interface device of claim 1, wherein the first haptic effect comprises a simulated coefficient of friction configured to simulate height or depth at the surface.

9. The interface device of claim 8, wherein the actuator is configured to change the simulated height or depth at the surface by generating the second haptic effect, the second haptic effect configured to change a surface relief of the surface.

10. The interface device of claim 1, wherein the second haptic effect is a vibration that corresponds to an edge crossing.

11. The interface device of claim 1, wherein the processor is further configured to cause the first haptic effect to change based on a location of the contact at the surface.

12. The interface device of claim 11, wherein the processor is further configured to cause the first haptic effect to change based on time.

13. The interface device of claim 11, wherein the processor is further configured to cause the first haptic effect to change based on a change of the location of the contact at the surface.

14. The interface device of claim 13, wherein the processor is further configured to recognize a gesture input based on the change of the location of the contact at the surface.

15. The interface device of claim 1, wherein the processor is further configured to cause the first haptic effect to change based on a humidity, a temperature, or an amount of ambient light.

16. The interface device of claim 1, wherein the processor is further configured to create the first haptic effect based on a velocity of the interface device or an acceleration of the interface device.

17. The interface device of claim 1, wherein the processor is further configured to:
   determine the impedance of the body part based on the sensor signal; and
   cause the first haptic effect to change based on the impedance of the body part at the surface.

18. The interface device of claim 1, wherein the sensor is configured to measure the impedance of the body part by applying a pulse to the surface and determining a voltage associated with the pulse.

19. The interface device of claim 1, wherein at least part of the surface is a nondisplay surface, and wherein the electrostatic device is configured to output the first haptic effect at the nondisplay surface and the actuator is configured to output the second haptic effect at the nondisplay surface.

20. The interface device of claim 19, wherein the nondisplay surface is part of a switch, knob, trackpad, remote control, or dashboard.

21. The interface device of claim 19, further comprising a slide bar on the nondisplay surface.

22. The interface device of claim 19, further comprising a second surface configured as a display surface, wherein the interface device is configured to output the first haptic effect at the nondisplay surface based on visual or audio content configured to be output at the second surface.

23. The interface device of claim 1, further comprising a thermal device configured to provide a third haptic effect at the surface using a third type of stimulus different from the first stimulus and the second stimulus, wherein the overall haptic effect comprises the first haptic effect, the second haptic effect, and the third haptic effect.

24. The interface device of claim 1, further comprising a display screen, wherein the surface is at least partially defined by the display screen.

25. The interface device of claim 1, wherein the electrostatic device comprises the electrode layer, and the electrode layer is positioned parallel to the surface.

26. The interface device of claim 25, wherein the electrostatic device comprises an insulator layer coupled between the electrode layer and the surface.

27. A method of providing an overall haptic effect, the method comprising:
receiving a signal from a surface of an interface device, the surface configured to detect a contact by a user or object interacting with the interface device and transmit the signal;
receiving a sensor signal from a sensor configured to detect an impedance of a body part contacting the surface and transmit the sensor signal;
determining a characteristic of a first haptic effect or a second haptic effect based at least in part on the sensor signal;
transmitting a first haptic signal to an electrostatic device, the first haptic signal configured to cause the electrostatic device to create the first haptic effect at the surface using a first type of stimulus by generating an electrostatic force between an electrode layer of the electrostatic device and the user or object; and
transmitting a second haptic signal to an actuator separate from the electrostatic device, the second haptic signal configured to cause the actuator to create the second haptic effect at the surface simultaneously to the first haptic effect and using a second type of stimulus that is different from the first type of stimulus;
wherein the overall haptic effect comprises the first haptic effect generated using the first type of stimulus and the second haptic effect generated using the second type of stimulus in order to provide feedback to the user or object interacting with the interface device.

28. The method of claim 27, wherein the overall haptic effect comprises at least one of a change in a simulated coefficient of friction, a vibration, a change in a surface relief at the surface, or a texture.

29. The method of claim 27, wherein the first haptic effect simulates a coefficient of friction or texture at the surface.

30. The method of claim 29, wherein the texture is at least one of roughness, bumpiness, stickiness, fineness, coarseness, or smoothness.

31. The method of claim 29, wherein the second haptic effect is a vibration or a change of a surface relief of the surface.

32. The method of claim 29, further comprising changing the simulated coefficient of friction by changing the first haptic effect with the electrostatic device or the second haptic effect with the actuator.

33. The method of claim 27, wherein the sensor detects the impedance by applying a pulse to the surface and determining a voltage associated with the pulse.

34. The method of claim 27, further comprising causing the first haptic effect or the second haptic effect to change based on the impedance of the body part at the surface.

35. The method of claim 27, wherein the first haptic effect is based on a humidity, a temperature, or an amount of ambient light.

36. The method of claim 32, wherein the changing the first haptic effect with the electrostatic device is based on a location of the contact detected at the surface or a change in the location of the contact at the surface.

37. The method of claim 31, further comprising simulating a height or depth with the electrostatic device based on a location of the contact detected at the surface.

38. The method of claim 37, wherein the simulating the height or depth is based on a topographical profile.

39. The method of claim 37, further comprising changing the simulated height or depth using the actuator by generating the second haptic effect, the second haptic effect configured to change the surface relief of the surface.

40. The method of claim 37, wherein the second haptic effect is a vibration that corresponds to an edge crossing.

41. The method of claim 40, wherein the second haptic effect is configured to simulate, at least in part, the edge crossing, and further comprising changing the simulated edge crossing over a period of time.

42. The method of claim 32, wherein the changing the first haptic effect with the electrostatic device is based on visual content displayed at the surface.

43. The method of claim 32, wherein the changing the first haptic effect with the electrostatic device is based on pressure on the surface or changes in the pressure on the surface over time and over locations on the surface.

44. The method of claim 27, further comprising generating, with a thermal device, a third haptic effect at the surface using a third type of stimulus different from the first stimulus and the second stimulus, the overall haptic effect comprising the first haptic effect, the second haptic effect, and the third haptic effect.

45. The method of claim 27, wherein the surface is a nondisplay surface.

46. The method of claim 45, wherein the surface is a first surface, and the first haptic effect is based on visual or audio content displayed at a second surface.

47. The method of claim 46, wherein the first haptic effect is based on the visual content displayed at a location on the second surface corresponding to a location of the contact at the surface.

48. The method of claim 45, wherein the nondisplay surface is part of a switch, knob, trackpad, remote control, or dashboard.

49. The method of claim 45, wherein the first haptic effect is output on a slide bar on the nondisplay surface.

* * * * *

UNITED STATES PATENT AND TRADEMARK OFFICE
CERTIFICATE OF CORRECTION

PATENT NO.        : 9,448,713 B2
APPLICATION NO. : 13/092269
DATED             : September 20, 2016
INVENTOR(S)       : Cruz-Hernandez et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 305 days.

Signed and Sealed this
Twenty-fifth Day of September, 2018

Andrei Iancu
*Director of the United States Patent and Trademark Office*